(12) United States Patent
Ashtiani et al.

(10) Patent No.: US 10,380,093 B2
(45) Date of Patent: *Aug. 13, 2019

(54) RESPONDING TO DATA REQUESTS RELATED TO CONSTRAINED NATURAL LANGUAGE VOCABULARY TERMS

(71) Applicant: INTERNATIONAL BUSINESS MACHINES CORPORATION, Armonk, NY (US)

(72) Inventors: Behrooz Ashtiani, Thornhill (CA); Yuanyuan Guo, Lincoln (CA); Mitra Khatibi, Richmond Hill (CA); Diana Lau, Richmond Hill (CA); Joanna W. Ng, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 715 days.

This patent is subject to a terminal disclaimer.

(21) Appl. No.: 14/838,424

(22) Filed: Aug. 28, 2015

(65) Prior Publication Data

US 2016/0179785 A1    Jun. 23, 2016

Related U.S. Application Data

(63) Continuation of application No. 14/576,956, filed on Dec. 19, 2014.

(51) Int. Cl.
*G06F 16/30* (2019.01)
*G06F 16/22* (2019.01)
(Continued)

(52) U.S. Cl.
CPC .... *G06F 16/2282* (2019.01); *G06F 16/24522* (2019.01); *G06F 16/338* (2019.01); *G06F 16/3344* (2019.01)

(58) Field of Classification Search
None
See application file for complete search history.

(56) References Cited

U.S. PATENT DOCUMENTS 7,680,767 B2    3/2010   Adya et al.
2006/0122964 A1*  6/2006   Yu .................. G06F 17/30383
(Continued)

OTHER PUBLICATIONS

U.S. Appl. No. 14/576,956 Non-Final Office Action dated Oct. 6, 2017.
(Continued)

*Primary Examiner* — Irete F Ehichioya
*Assistant Examiner* — Johnese T Johnson
(74) *Attorney, Agent, or Firm* — Law Office of Jim Boice (57) ABSTRACT

One or more processors generate a data source table. The data source table is specific for a particular constrained natural language (cNL) vocabulary term from a cNL vocabulary dictionary. The data source table includes a location reference to multiple predetermined data sources that contain data related to the particular cNL vocabulary term, where at least two of the multiple predetermined data sources are disparate types of data sources as compared to each other. The data source table also includes a location reference to a materialized view of data from each of the multiple data sources, where the materialized view of data is data that is related to the particular cNL vocabulary term. One or more processors receive a request for data related to the particular cNL vocabulary term from a requester, and then retrieve data from multiple materialized views from the data source table to the requester.

19 Claims, 4 Drawing Sheets

(51) Int. Cl.
    *G06F 16/338*     (2019.01)
    *G06F 16/33*     (2019.01)
    *G06F 16/2452*     (2019.01)

(56) References Cited

U.S. PATENT DOCUMENTS

| | | |
|---|---|---|
| 2009/0177697 A1 | 7/2009 | Gao et al. |
| 2012/0254143 A1* | 10/2012 | Varma ................. G06F 17/2785 707/706 |
| 2016/0012465 A1 | 1/2016 | Sharp |

OTHER PUBLICATIONS

Anonymous, "Akamai Reveals 2 Seconds as the New Threshold of Acceptability for eCommerce Web Page Response Times", Akamai Technologies; akamai.com, Sep. 14, 2009, pp. 1-4.

Anonymous, "How ATG Search Works", Oracle, Inc., docs.oracle.com, retrieved Sep. 29, 2014, pp. 1-2.

A. Slaughter, "OLAP", PROFIT Initiative, MIT Sloan School of Management, Jun. 1998, pp. 1-23.

Anonymous, "Oracle Essbase", Oracle, Inc., www.oracle.com, retrieved Sep. 29, 2014, pp. 1-7.

Anonymous, "Cognos Dynamic Cubes Overview", IBM Corporation, retrieved Sep. 29, 2014, pp. 1-3.

IBM Corporation, "IBM Watson Explorer Architecture", IBM Corporation, IBM Software White Paper, 2014, pp. 1-20.

List of IBM Patents or Patent Applications Treated as Related, Aug. 28, 2015, 2 pages.

* cited by examiner

RESPONDING TO DATA REQUESTS RELATED TO CONSTRAINED NATURAL LANGUAGE VOCABULARY TERMS

BACKGROUND

The present disclosure relates to the field of electronic data sources, and specifically to retrieving data from electronic data sources. Still more particularly, the present disclosure relates to retrieving data related to constrained natural language vocabulary terms.

SUMMARY

In an embodiment of the present invention, a processor-implemented method responds to data requests by a computer system. One or more processors generate a data source table. The data source table is specific for a particular constrained natural language (cNL) vocabulary term from a cNL vocabulary dictionary. The cNL vocabulary dictionary contains multiple cNL vocabulary terms. The data source table includes a location reference to multiple predetermined data sources that contain data related to the particular cNL vocabulary term, where at least two of the multiple predetermined data sources are disparate types of data sources as compared to each other. The data source table also includes a location reference to a materialized view of data from each of the multiple data sources, where the materialized view of data is data that is related to the particular cNL vocabulary term. One or more processors receive a request for data related to the particular cNL vocabulary term from a requester, retrieve data from multiple materialized views from the data source table, and return the retrieved data to the requester.

In an embodiment of the present invention, a system includes a dictionary storage device, a data source table storage device, a data receiving device, a data retrieving device, and a data transmitting device. The dictionary storage device stores a constrained natural language (cNL) vocabulary dictionary, where the cNL vocabulary dictionary contains multiple cNL vocabulary terms. The data source table storage device stores a data source table, which is specific for a particular cNL vocabulary term from the cNL vocabulary dictionary. The data source table includes a location reference to multiple predetermined data sources that contain data related to the particular cNL vocabulary term, where at least two of the multiple predetermined data sources are disparate types of data sources as compared to each other. The data source table also includes a location reference to a materialized view of data from each of the multiple data sources, where the materialized view of data is data that is related to the particular cNL vocabulary term. The data receiving device receives a request for data related to the particular cNL vocabulary term from a requester. The data retrieving device retrieves data from multiple materialized views from the data source table. The data transmitting device returns data from the multiple materialized views from the data source table to the requester.

In an embodiment of the present invention, a computer program product responds to data requests by a computer system. The computer program product comprises a computer readable storage medium having program code embodied therewith, where the computer readable storage medium is not a transitory signal per se, and where the program code is readable and executable by a processor to perform a method. The method includes creating a constrained natural language (cNL) vocabulary dictionary, where the cNL vocabulary dictionary contains multiple cNL vocabulary terms. The method further generates a data source table, which is specific for a particular cNL vocabulary term from the cNL vocabulary dictionary. The data source table includes a location reference to multiple predetermined data sources that contain data related to the particular cNL vocabulary term, where at least two of the multiple predetermined data sources are disparate types of data sources as compared to each other. The data source table also includes a location reference to a materialized view of data from each of the multiple data sources, where the materialized view of data is data that is related to the particular cNL vocabulary term. The method further receives a request for data related to the particular cNL vocabulary term from a requester, retrieves data from multiple materialized views from the data source table, and returns data from the multiple materialized views from the data source table to the requester.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In one or more embodiments of the present invention, a materialized views collection provides informatics queries performance enhancement in natural language involving multi-structured data types and multi-sourced data. The present invention can be applied on any data types, including but not limited to structured data (databases), semi-structured data (e.g., comma-separated values (CSV) files, extended markup language (XML) files, log files, etc.), unstructured data (e.g., documents, emails, etc.), and streaming data (e.g., short messages such as "tweets", rich site summary (also known as really simple syndication) RSS feeds, etc.). As described herein and in one or more embodiments of the present invention, the present disclosure relates to the area of optimizing informatics queries using constrained Natural Language (cNL) to query multi-sourced data containing multi-structured data types.

Figure 1:
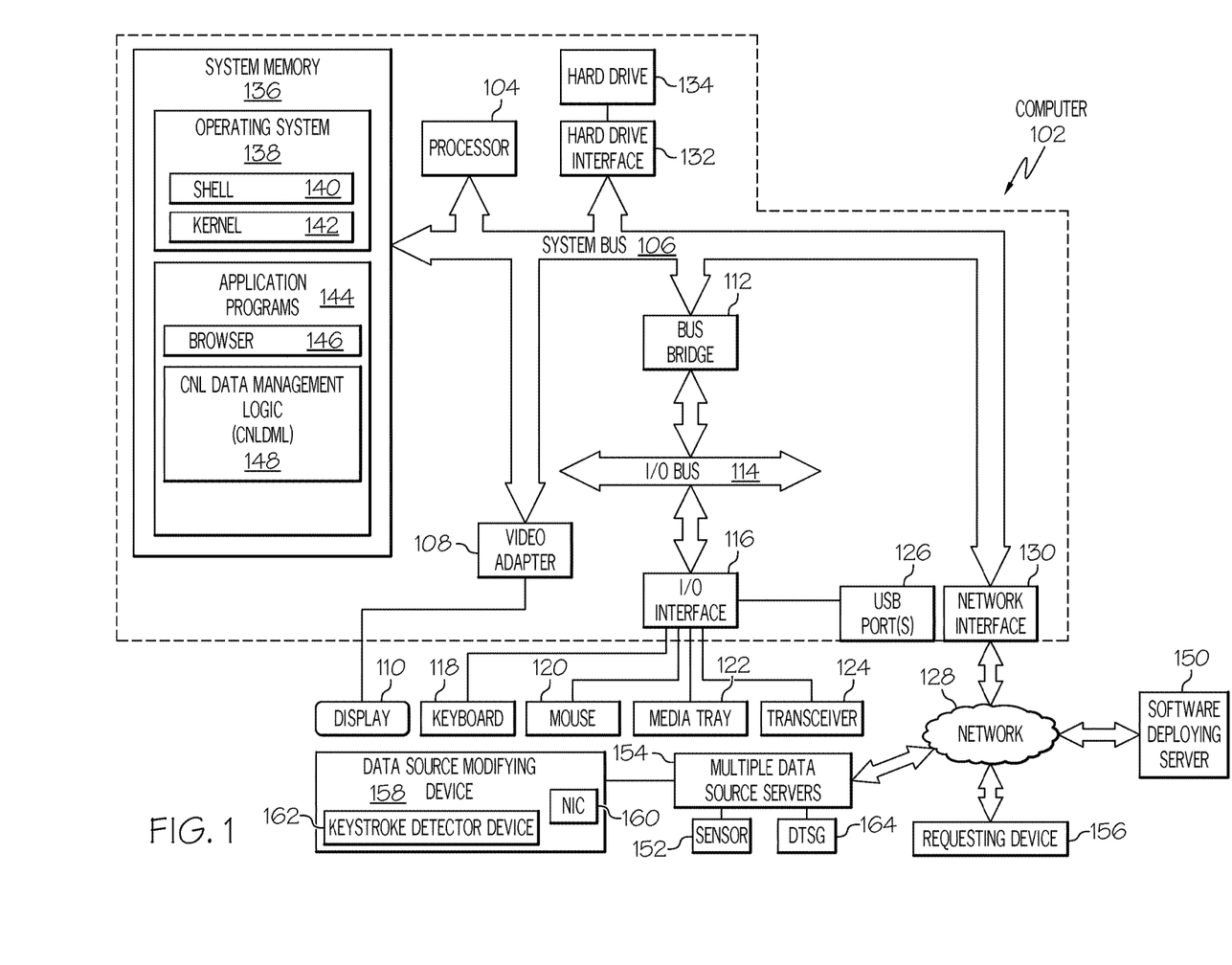
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or the multiple data source servers 154 and/or the requesting device 156 and/or the data source modifying device 158 depicted in FIG. 1.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a constrained natural language data management logic (CNLDML) 148. CNLDML 148 includes code for implementing the processes described below, including those described in FIGS. 2-4. In one embodiment, computer 102 is able to download CNLDML 148 from software deploying server 150, including in an on-demand basis, wherein the code in CNLDML 148 is not downloaded until needed for execution. Note further that, in one embodiment of the present invention, software deploying server 150 performs all of the functions associated with the present invention (including execution of CNLDML 148), thus freeing computer 102 from having to use its own internal computing resources to execute CNLDML 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
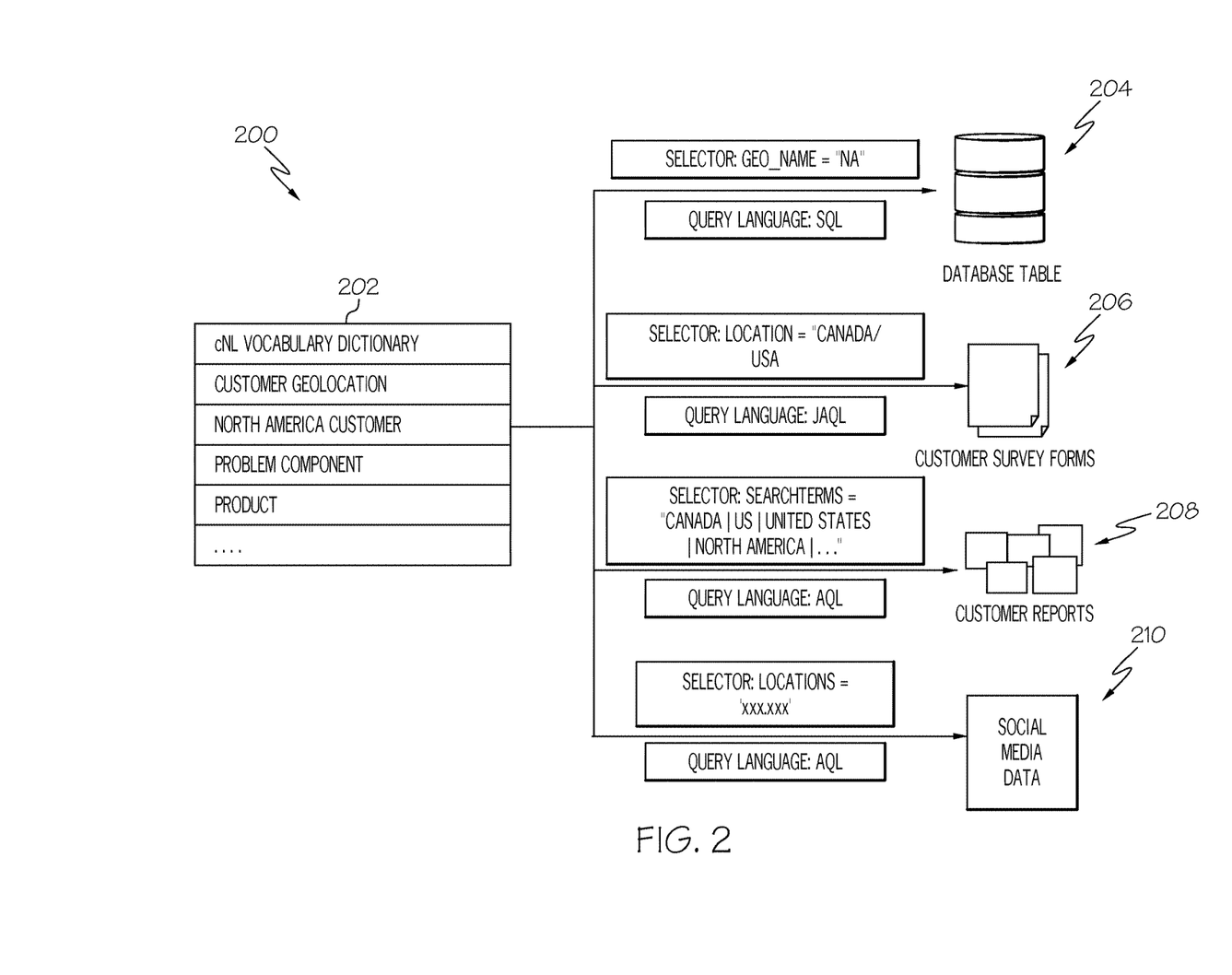
FIG. 2 illustrates an exemplary correlation between a constrained natural language vocabulary dictionary and disparate types of data sources in accordance with one or more embodiments of the present invention.

With reference now to FIG. 2 a system 200 depicts an exemplary correlation between a constrained natural language vocabulary dictionary 202 and disparate types of data sources in accordance with one or more embodiments of the present invention. The data sources are stored in data source servers, such as the multiple data source servers 154 shown in FIG. 1.

Constrained natural language (cNL) is similar to natural language, in which non-programming entries (i.e., "natural language" for a human) are converted into computer-executable instructions, thus enabling a computer to derive meaning from human (i.e., natural language) input. Constrained natural language (cNL) is natural language, with the additional constraint of the system understanding only natural language terms (words or phrases) that have been pre-approved. These constrained natural language terms may be input directly by a user (who understands/knows about the constraints), or they may be generated by the system converting (i.e., paraphrasing) an unrestricted natural language input from the user into a constrained natural language term (e.g., using a lookup table, mapping system, etc.).

As depicted, the cNL vocabulary dictionary 202 holds multiple vocabulary terms. Each of the vocabulary terms within the cNL vocabulary dictionary 202 is associated with multiple data sources. Each of the data sources contain data that is related to one or more of the vocabulary terms stored in the cNL vocabulary dictionary 202.

For example, the vocabulary term "North America customer" may be associated with (e.g., "point to") a database table 204. Database table 204 contains data that is relevant to the cNL vocabulary term "North America customer". Database table 204 may include data related to legal regulations relevant to a customer from North America, contracts and contacts for this customer, current jobs between an enterprise and this customer, etc. As depicted, data is accessed from the database table 204 using a first message format, such as a structured query language (SQL) message.

The vocabulary term "North America customer" may also be associated with (e.g., "point to") customer survey forms 206, which were filled out by an enterprise's customers in North America. Such surveys/questionnaires may be related to topics generated by an enterprise who is a vendor of goods and/or services to the customers, or the topics/questionnaires may be created by the customers themselves. Note that in this exemplary embodiment, data from the customer survey forms 206 is retrieved using a different format/language than that used to query data from the database table 204. More specifically, data from the customer survey forms 206 is retrieved using messages in a JAQL format. JAQL is a query language designed for Javascript Object Notation (JSON). Conceptually, JAQL is a pipeline of data flowing from a source, through a set of various operators, and out into a sink (a destination). The operand used to signify flow from one operand to another is an arrow: →. Unlike SQL, where the output comes first (for example, the SELECT list), in JAQL the operations are listed in a natural order, where the user specifies the source, followed by various operators used to manipulate the data, and finally the sink.

The vocabulary term "North America customer" may also be associated with (e.g., "point to") customer reports 208, which may be filled out by the enterprise who is a vendor of goods and/or services to the customers. Note that in this exemplary embodiment, data from the customer reports 208 is retrieved using a different format/language than that used to query data from the database table 204 or that used to query data from the customer survey forms 206. As depicted in FIG. 2, queries for data from the customer reports 208 may use Annotation Query Language (AQL) syntaxed queries. AQL is a language for building extractors that extract structured information from unstructured or semistructured text. The syntax of AQL is similar to that of SQL, excepts that AQL is case-sensitive; allows, but does not require, regular expressions to be expressed in Perl syntax (e.g., /regex/instead of 'regex'); does not support advanced SQL features like correlated subqueries and recursive queries; has a new statement type, extract, that is not present in SQL; does not allow keywords as view, column, or function names; and parses queries that are different from the parsing protocol used by SQL.

The vocabulary term "North America customer" may also be associated with (e.g., "point to") social media data 210 from a social media service, which may have data from short messages, webpage postings, etc. As with requests to the customer reports, data from the social media data 210 is retrieved using a different format/language than that used to query data from the database table 204 or that used to query data from the customer survey forms 206, such as AQL.

If data from the disparate data sources (e.g., elements 204, 206, 208, 210 shown in FIG. 2) were to be directly accessed, the overhead in time, bandwidth, and processing would be very high. If such accesses were to be performed simultaneously, there is also a likelihood of collision between the disparate accesses, due to different formats, query languages, response times, etc. One or more embodiments of the present invention address this issue through the use of a data source table.

Figure 3:
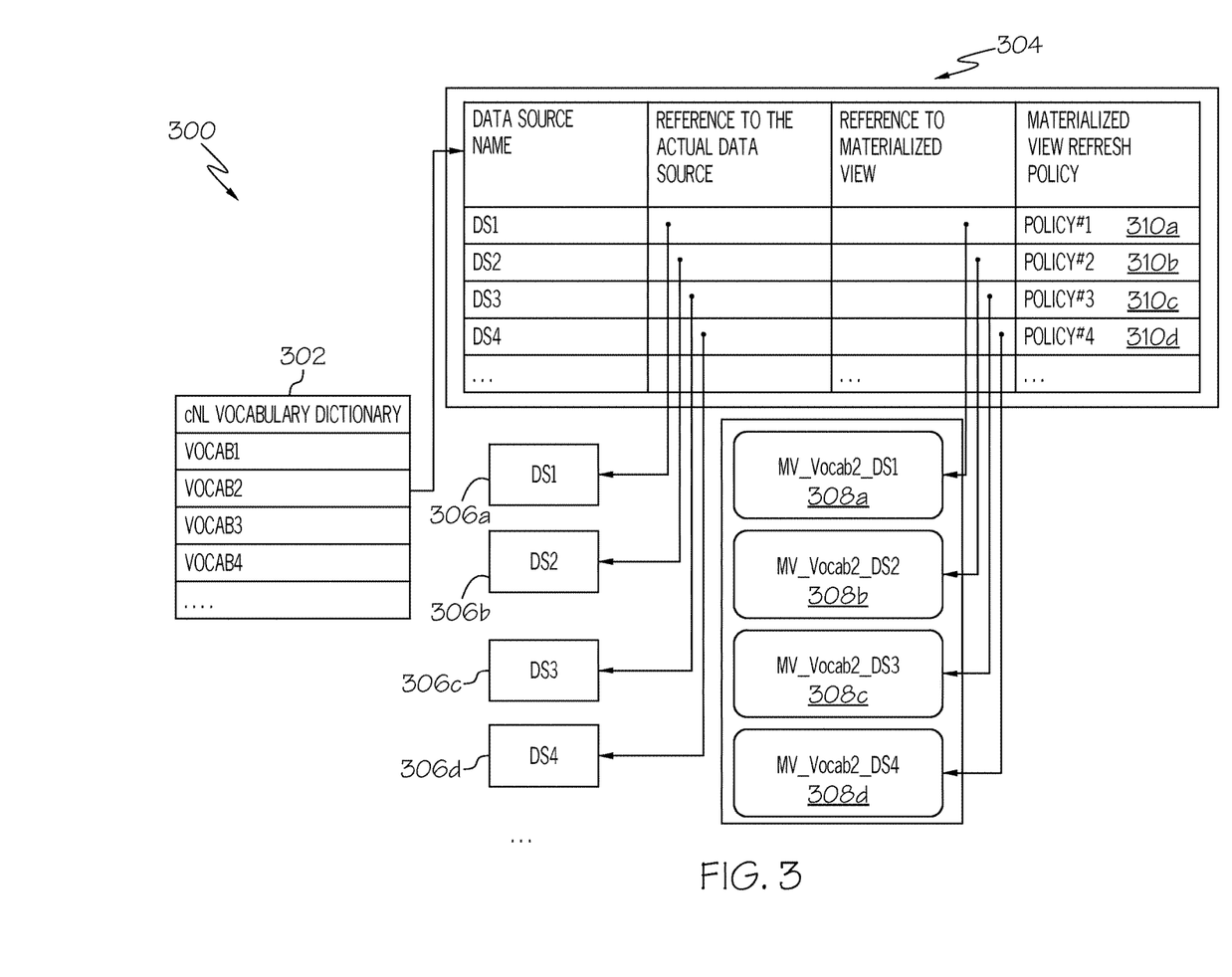
FIG. 3 depicts a relationship between a constrained natural language vocabulary dictionary and a novel data source table in accordance with one or more embodiments of the present invention.

With reference now to FIG. 3, a system 300 depicts a relationship between a constrained natural language (cNL) vocabulary dictionary 302 and a novel data source table 304 in accordance with one or more embodiments of the present invention. As depicted, the cNL vocabulary dictionary 302 contains multiple cNL terms (depicted as "Vocab1", "Vocab2", "Vocab3", and "Vocab4"). Each of these cNL terms is associated with a dedicated data source table. For example and as shown in FIG. 3, Vocab2 is associated with the depicted data source table 304. Thus, any data source that contains data related to Vocab2 is referenced by location references 306a-306d. For purposes of illustration, assume that location reference 306a identifies the location (e.g., uniform resource locator, storage device, memory address, etc.) of database table 204 in FIG. 2; location reference 306b identifies the location of customer survey forms 206; location reference 306c identifies the location of customer reports 208; and location reference 306d identifies the location of social media data 210.

Also included in the data source table 304 are location references to materialized data from the data sources. That is, each data source provides specific data related to Vocab2 in the example shown in FIG. 3. This specific data is retrieved and stored at locations 308a-308d (e.g., at certain URLs, memory locations, storage devices, etc.) as a "materialized view of the data" (i.e., a copy of the retrieved data itself). The address of these locations/devices is stored in the data source table 304. For example, data retrieved from database table 204 that is related to "North America customer" is stored as a materialized view of that data in a device whose address is "MV_Vocab2_DS1" (element 308a). This address is stored within the data source table 304, thus allowing the system to quickly access the relevant data at that location.

In one or more embodiments of the present invention, one or more of the Policies 190 1-#4 (elements 310a-310d) are based on a particular subject matter, such as a particular industry, customer, area of science, etc. In one or more embodiments, the subject matter is derived from a context/meaning of the vocabulary word from the cNL vocabulary dictionary 302. For example, assume that Vocab1 is the term "Blood Pressure", thus indicating that Vocab1 is related to the field of medicine. Policy#1 may be specific for medical records, which are subject to confidentiality issues. For example, Policy#1 may require that any medical records data have patient names redacted. Thus, Policy#1 is specific for the field of medicine. Similarly, other fields (e.g., banking, education, etc.) may have special requirements as to how they are collected and/or stored in the data source table 304. These requirements are reflected within one or more of the policies (e.g., elements 310a-310d) in the data source table 304.

In one embodiment of the present invention, cross-mapping between terms in the cNL vocabulary dictionary 302 allows linkage to multiple data source tables. For example, assume that Vocab1 from cNL vocabulary dictionary 302 in FIG. 3 is the term "Blood Pressure" and Vocab2 is the term "Atrial Fibrillation". Since "Blood Pressure" and "Atrial Fibrillation" both relate to cardiology, then an assumption can be made that a data source table associated with Vocab1 is also relevant to Vocab2. That is, in FIG. 3, Vocab2 is depicted as being directed to data source table 304. However, if Vocab1 and Vocab2 both relate to the same subject matter (e.g., "medicine", or more specifically "cardiology"), then when data related to Vocab1 is requested, a link between Vocab1 and Vocab2 will result in a retrieval of data from data source table 304 (originally compiled for Vocab2) for the request for data related to Vocab1.

Also stored within the data source table 304 are Policies 190 1-#4 (elements 310a-310d). In one embodiment, a policy may be related to multiple data sources/data locations. In another embodiment, each policy relates to a single data source and/or data location. For example, consider "POLICY#1" (policy 310a). POLICY#1 defines a policy related to how often materialized views should be updated, where the data can come from, when the data can be extracted from a data source, etc. For example POLICY#1 may state that data from data source 1 (ds1) relevant to Vocab2 should be updated every 4 hours, whenever data from data source 1 is accessed, whenever certain physical conditions are detected, etc. Additional detail of such policies is presented below.

Figure 4:
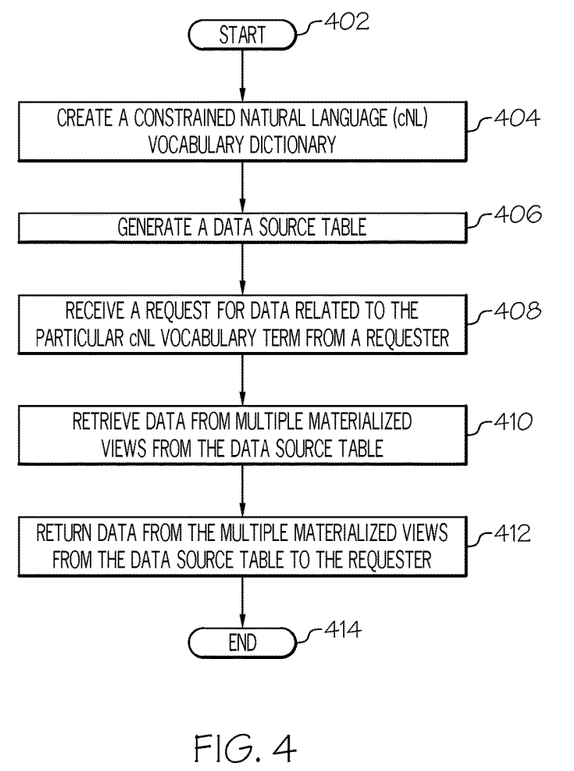
FIG. 4 is a high level flow-chart of one or more operations performed by one or more hardware devices to respond to data requests related to constrained natural language vocabulary terms.

With reference now to FIG. 4, a high level flow-chart of one or more operations performed by one or more hardware devices to respond to data requests related to constrained natural language vocabulary terms is presented.

After initiator block 402, a constrained natural language (cNL) dictionary is created (block 404). In one or more embodiments of the present invention, the cNL vocabulary dictionary contains multiple cNL vocabulary terms.

One or more processors (e.g., processor 104 in FIG. 1) generate a data source table (e.g., data source table 304 in FIG. 3), as described in block 406. As described in FIG. 3, the data source table is specific for a particular cNL vocabulary term from the cNL vocabulary dictionary (e.g., cNL vocabulary dictionary 302 in FIG. 3).

The data source table also includes a location reference (e.g., elements 306a-306d in FIG. 3) to multiple predetermined data sources that contain data related to the particular cNL vocabulary term. As described herein, at least two of the multiple predetermined data sources are disparate types of data sources as compared to each other (e.g., one holds data that must be accessed by SQL queries while another holds data that must be accessed using JAQL queries).

The data source table also includes a location reference (e.g., elements 308a-308d in FIG. 3) to a materialized view of data from each of the multiple data sources. As described herein, the materialized view of data is data that is related to the particular cNL vocabulary term.

As described in block 408, a system (e.g., computer 102 in FIG. 1) receives a request for data related to the particular cNL vocabulary term from a requester (e.g., a user of requesting device 156 shown in FIG. 1).

As described in block 410, the system retrieves data from multiple materialized views from the data source table. As described herein, the location of these multiple materialized views, which come from disparate sources and/or are disparately formatted, are stored in the data source table.

As described in block 412, the system (e.g., computer 102 in FIG. 1) then returns data from the multiple materialized views from the data source table to the requester. The flow-chart ends at terminator block 414.

In an embodiment of the present invention, the data source table is populated with a materialized view refresh policy for each said materialized view of data from each of the multiple data sources. For example and as shown in FIG. 3, refresh policies 310a-310d are stored within the data source table 304. A single refresh policy (e.g., POLICY#1—310a) may be relevant to only one data source and/or materialized view of data related to a particular cNL vocabulary term, or it may be applicable to multiple data sources and/or materialized views of cNL vocabulary terms.

In an embodiment of the present invention, the materialized view of data from each of the multiple data sources is then updated according to the materialized view refresh policy. The materialized view refresh policy may be invoked by various actions/conditions in accordance with various embodiments of the present invention.

For example and in one embodiment of the present invention, a refresh of one or more materialized views of data is triggered by a content change to one or more of the data sources. That is, any time that data from a data source (which has been mapped to/deemed related to a particular cNL vocabulary term) changes, then the location of that updated data is refreshed in the data source table, thus ensuring that the most accurate/recent location of the materialized view of the related data is contained within the data source table.

In another example and embodiment of the present invention, a refresh of one or more materialized views of data is triggered by a new access of one or more of the data sources. For example, assume that the network interface device (NIC) 160 in FIG. 1 detects a communication session between a data source modifying device 158 and a data source server (from the multiple data source servers 154) that supports one or more of the data sources. Assume further that a keystroke detector device 162 associated with the data source modifying device 158 detects a keystroke entry in a data source modifying device 158. The computer 102 will then determine, based on the communication session detected by the network interface device and the keystroke entry detected by the keystroke detector device, that the data source modifying device has accessed one or more of the data sources. This will thus trigger a refreshing of the data source table 304 in FIG. 3, to include a refreshment of the materialized view location (e.g., elements 308a-308d) found in the data source table 304.

In an embodiment of the present invention, a refresh of one or more materialized views of data by one or more materialized view refresh policies is triggered based on a change detected by a sensor in a data source server that supports a data source, wherein the sensor detects a physical condition of the data source server. For example, assume that sensor 152 is a thermometer that measures a temperature of one of the data source servers 154. If the temperature rises beyond a predetermined level, this may indicate that a hard drive within the data source server is being accessed repeatedly, thus indicating that the data to be materialized is changing.

In another example and embodiment, assume that sensor 152 is an atmospheric pressure sensor, which is able to detect a real-time altitude (i.e., distance above sea level) of a data source server (e.g., an on-board computer on an aircraft). Assume further that cNL vocabulary terms within the cNL vocabulary dictionary 202 in FIG. 2 are related to operational conditions of the aircraft (e.g., airspeed, engine RPMs, fuel consumption, etc.). When the aircraft reaches a certain altitude, these conditions are likely to change, thus triggering the rule to modify the location (e.g., a reserved location in memory from one address to another address) of the materialized view of data related to the operational conditions.

In another example embodiment of the present invention, the sensor 152 is a positioning sensor, which determines a physical location of the first communication device 154. For example, assume that a global positioning system (GPS) device (not depicted) within sensor 152 determines that a data source server (e.g., a tablet computer) from the multiple data source servers 154) has moved from one location to another location. Assume further that data related to cNL vocabulary terms are customer-specific, and that the user of the tablet computer has traveled from a first customer's location to a second customer's location. The GPS will then direct the data source server (tablet computer) to obtain data relevant to the second customer, and/or to erase data relevant to the first customer. Thus, the materialized view of data relevant to the cNL vocabulary term will change, as will its location (e.g., element 308a in FIG. 3), as triggered by policy 310a.

In an embodiment of the present invention, the materialized view refresh policy is matched and implemented according to a type of data source server that supports a particular data source. For example, assume that a first data source server from data source servers 154 in FIG. 1 is a blade server chassis, and a second data source server from data source servers 154 is a tablet computer. The refresh policy for refreshing materialized (i.e., retrieved) data related to the cNL vocabulary terms will be different for the blade server chassis and the tablet computer. For example, the refresh policy for the blade server chassis may be to refresh the materialized view every 30 minutes if the blade server chassis supports thousands of users. However, it is unlikely that a tablet computer would provide such data to many, if any, other systems. Alternatively, the tablet computer will be mobile while the blade server chassis will not. Thus, the rule for the tablet computer may be related to changes in location, which would not be applicable to the blade server chassis.

In an embodiment of the present invention, the type of data source server can be provided by a universal unique identifier (UUID) from within one of the multiple data source servers 154 shown in FIG. 1. A monitoring device (e.g., transceiver 124) receives a device type signal that identifies the type of data source server. For example, assume that the device type signal generator (DTSG) 164 receives a UUID found in one of the multiple data source servers 154 (the UUID is not shown in FIG. 1), thus identifying that data source server as a laptop computer. Due to its portable nature and limited (compared to a blade server chassis) computing power, this laptop computer will have a refresh policy (for refreshing materialized views of data relevant to the cNL vocabulary terms) that is specifically tailored to laptop computers.

In an embodiment of the present invention, a system responds to data requests. A dictionary storage device (e.g., hard drive 134 in FIG. 1) stores a constrained natural language (cNL) vocabulary dictionary, which contains multiple cNL vocabulary terms. A data source table storage device (e.g., system memory 136 in FIG. 1) stores a data source table, which is specific for a particular cNL vocabulary term from the cNL vocabulary dictionary. As described herein, the data source table includes a location reference to multiple predetermined data sources that contain data related to the particular cNL vocabulary term, where at least two of the multiple predetermined data sources are disparate types of data sources as compared to each other. The data source table also includes a location reference to a materialized view of data from each of the multiple data sources, where the materialized view of data is data that is related to the particular cNL vocabulary term.

A data receiving device (e.g., transceiver 124 and/or network interface 130 in FIG. 1) receives a request for data related to the particular cNL vocabulary term from a requester (e.g., a user of requesting device 156 in FIG. 1). A data retrieving device (e.g., processor 104) retrieves data from multiple materialized views from the data source table. A data transmitting device (e.g., transceiver 124 and/or network interface 130) returns data from the multiple materialized views from the data source table to the requester.

In an embodiment of the present invention, the data source table is populated with a materialized view refresh policy for each said materialized view of data from each of the multiple data sources. The system further includes a network interface device (e.g., NIC 160 in FIG. 1) on a data source modifying device (e.g., data source modifying device 158). The network interface device detects a communication session between the data source modifying device and a data source server (e.g., from the multiple data source servers 154 in FIG. 1) that supports one or more of the data sources. A keystroke detector device (e.g., keystroke detector device 162) on the data source modifying device detects a keystroke entry in a data source modifying device. In one or more embodiments of the present invention, the keystroke detector device is a mechanical device that changes mechanical counters whenever it receives a signal indicating that a user of the data source modifying device 158 is typing on a keyboard within the data source modifying device. One or more processors (e.g., processor 104 in FIG. 1) determine that the data source modifying device has accessed one or more of the data sources based on the communication session detected by the network interface device and the keystroke entry detected by the keystroke detector device, and then trigger a refresh of one or more materialized views of data by one or more materialized view refresh policies, such that the refresh is triggered by the data source modifying device accessing said one or more of the data sources.

In an embodiment of the present invention, the data source table is populated with a materialized view refresh policy for each materialized view of data from each of the multiple data sources. The system further includes a sensor (e.g., sensor 152 shown in FIG. 1) on a data source server that supports the data source. The sensor detects a physical condition, such as location, temperature, pressure, etc., of the data source server. One or more processors then trigger a refresh of one or more materialized views of data by one or more materialized view refresh policies based on a change detected by the sensor in the data source server.

In an embodiment of the present invention, the data source table is populated with a materialized view refresh policy for each materialized view of data from each of the multiple data sources. The system further includes a device type signal generator (e.g., DTSG 164 in FIG. 1) that is coupled to a data source server, where the device type signal generator identifies a server type of the data source server. One or more processors then match and implement the materialized view refresh policy according to the server type of data source server.

In accordance with one or more embodiments of the present invention, a processing system is improved by reducing execution time for informatics queries. This reduced execution time occurs since data in pre-fetched and pre-calculated materialized views for each of the data sources are being accessed via locations described in the data access table, instead of fetching and processing the data on-the-fly. As described herein, the materialized view tore pre-fetched aggregated data based on the vocabulary of the cNL dictionary. Furthermore, the present invention improves the functionality of a processing system since materialized views can be stored in locations closer to the analytics platform (e.g., an analytical system such as computer 102 in FIG. 1), thereby reducing network latency. That is, data related to the cNL vocabulary terms does not need to be fetched from actual data sources, which are likely to be remote and distributed, but rather from local and/or centralized storage sources as materialized views, which are readily available from information in the data source table described herein.

As described herein and in one or more embodiments of the present invention, each term in a constrained Natural Language (cNL) vocabulary dictionary (e.g., cNL vocabulary dictionary 302 in FIG. 3) is associated with a collection of materialized views (e.g., data source table 304 in FIG. 3). The materialized view stores pre-fetched aggregated data based on the vocabulary of (e.g., terms within) the dictionary. By using the vocabulary in the cNL vocabulary dictionary, an identification of which materialized views to query is made. In one or more embodiments, the system described herein uses parallel query execution to execute the queries against the identified materialized views, thus querying multi-sourced data with multi-structured data types simultaneously (i.e., in parallel). That is, as depicted in FIG. 2, disparate types of data sources (e.g., data from a database table 204, data from customer survey forms 206, data from customer reports 208, social media data 210) are from different sources (and thus are multi-sourced data) and are in different formats/structure (and thus are multi-structured data types). The present invention allows access to all such multi-sourced data having multi-structured data types simultaneously.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of responding to data requests by a computer system, the processor-implemented method comprising:

creating, by one or more processors, a constrained natural language (cNL) vocabulary dictionary, wherein the cNL vocabulary dictionary contains multiple cNL vocabulary terms;

generating, by one or more processors, a data source table, wherein the data source table is specific for a particular constrained natural language (cNL) vocabulary term from a cNL vocabulary dictionary, wherein the cNL vocabulary dictionary contains multiple cNL vocabulary terms, wherein the data source table comprises location references to multiple predetermined data sources that contain data related to the particular cNL vocabulary term, wherein at least two of the multiple predetermined data sources are disparate types of data sources as compared to each other, wherein the data source table comprises location references to materialized views of data from each of the multiple data sources, wherein the data source table is populated with a materialized view refresh policy for each said materialized views of data from each of the multiple data sources, and wherein the materialized views of data are data that is related to the particular cNL vocabulary term;

receiving, by one or more processors, a request for data related to the particular cNL vocabulary term from a requester;

retrieving, by one or more processors, data from multiple materialized views from the data source table;

returning, by one or more processors, data from the multiple materialized views from the data source table to the requester;

detecting, by a sensor on a data source server that supports a data source, a physical condition of the data source server, wherein the physical condition comprises a change in altitude of a physical location of the data source server beyond a certain level, and a change in a geographic physical location of the data source server from a first geographic location to a second geographic location; and triggering, by one or more processors, a refresh of one or more materialized views of data by one or more materialized view refresh policies based on a change detected by the sensor in the data source server.

2. The processor-implemented method of claim 1, further comprising:

populating, by one or more processors, the data source table with a materialized view refresh policy for each said materialized views of data from each of the multiple data sources.

3. The processor-implemented method of claim 2, further comprising:

updating, by one or more processors, the materialized views of data from each of the multiple data sources according to the materialized view refresh policy.

4. The processor-implemented method of claim 2, wherein each said materialized views of data share a same materialized view refresh policy.

5. The processor-implemented method of claim 2, wherein each said materialized views of data are associated with a different materialized view refresh policy.

6. The processor-implemented method of claim 2, further comprising:

triggering, by one or more processors, a refresh of the materialized views of data by one or more materialized view refresh policies, wherein the refresh is triggered by a new access of one or more of the data sources.

7. The processor-implemented method of claim 6, further comprising:

detecting, by a network interface device, a communication session between a data source modifying device and a data source server that supports one or more of the data sources;

detecting, by a keystroke detector device, a keystroke entry in the data source modifying device; and determining, by one or more processors, that the data source modifying device has accessed one or more of the data sources based on the communication session detected by the network interface device and the keystroke entry detected by the keystroke detector device.

8. The processor-implemented method of claim 2, further comprising:

triggering, by one or more processors, a refresh of one or more materialized views of data by one or more materialized view refresh policies based on a change detected by a sensor in a data source server that supports a data source, wherein the sensor detects a physical condition of the data source server.

9. The processor-implemented method of claim 2, further comprising:
matching and implementing, by one or more processors, the materialized view refresh policy according to a type of data source server that supports a particular data source.

10. The processor-implemented method of claim 1, wherein data from each of the multiple predetermined data sources are retrieved using a different format and language than that used by other data sources from the multiple predetermined data sources.

11. The processor-implemented method of claim 1, wherein a first data source from the multiple predetermined data sources uses a structured query language (SQL) message to access data in the first data source, wherein a second data source from the multiple predetermined data sources uses a JavaScript Object Notation (JSON) based JAQL message to access data in the second data source, and wherein a third data source from the predetermined data sources uses an Annotation Query Language (AQL) syntaxed query message to access data in the third data source.

12. The processor-implemented method of claim 1, wherein the multiple predetermined data sources comprise a database table, a set of survey forms, a set of customer reports, and a set of social media postings.

13. The processor-implemented method of claim 1, wherein a particular data source from the multiple data sources is a webpage, and wherein the location reference to the materialized views of data from the webpage is a uniform resource locator (URL) of the webpage.

14. The processor-implemented method of claim 1, wherein a particular data source from the multiple data sources is a memory device, and wherein the location reference to the materialized views of data from the memory device is a memory address in the memory device.

15. The processor-implemented method of claim 1, wherein one or more materialized views of data provides data that describes a particular type of subject matter, and wherein the processor-implemented method further comprises:
triggering a refresh of the one or more materialized views of data in one or more of the multiple data sources according to a refresh policy, wherein the refresh policy is specific for the particular type of subject matter.

16. The processor-implemented method of claim 1, further comprising:
triggering a refresh of one or more materialized views of data based on a materialized view refresh policy, wherein the materialized view refresh policy is based on a change in temperature detected by a thermometer in a data source server that transmits data to one of the multiple predetermined data sources that contain data related to the particular cNL vocabulary term.

17. The processor-implemented method of claim 1, further comprising:
triggering a refresh of one or more materialized views of data based on a materialized view refresh policy, wherein the materialized view refresh policy is based on a change in altitude detected by an atmospheric pressor sensor in an aircraft that transmits data to one of the multiple predetermined data sources that contain data related to the particular cNL vocabulary term.

18. The processor-implemented method of claim 1, wherein the data that describes information that is related to the particular cNL vocabulary term is customer specific, wherein the request for data is from a mobile computer, and wherein the processor-implemented method further comprises:
detecting, based on positioning signals generated by a positioning system in the mobile computer, that the mobile computer has moved from a first location of a first customer to a second location of a second customer; and
in response to detecting that the mobile computer has moved from a first location of a first customer to a second location of a second customer, replacing the data that describes information that is related to the particular cNL vocabulary term and is specific for the first customer with data that describes information that is related to the particular cNL vocabulary term and is specific for the second customer.

19. The processor-implemented method of claim 1, further comprising:
triggering a refresh of one or more materialized views of data based on a type of data source server that supports a particular data source, wherein materialized views of data from a blade server chassis type of data source server are refreshed more frequently than materialized views of data from a mobile computer type of data source server.

* * * * *